(12) United States Patent
Ge et al.

(10) Patent No.: US 8,279,363 B2
(45) Date of Patent: Oct. 2, 2012

(54) TWISTED NEMATIC (TN) BASED 3D DISPLAY SYSTEM AND METHOD

(75) Inventors: Zhang Ge, Shenzhen (CN); Fuzhong Guo, Shenzhen (CN)

(73) Assignee: SuperD Co., Ltd., Shenzhen (CN)

( * ) Notice: Subject to any disclaimer, the term of this patent is extended or adjusted under 35 U.S.C. 154(b) by 164 days.

(21) Appl. No.: 12/906,250

(22) Filed: Oct. 18, 2010

(65) Prior Publication Data
US 2011/0176074 A1    Jul. 21, 2011

Related U.S. Application Data

(63) Continuation of application No. PCT/CN2010/070290, filed on Jan. 20, 2010.

(51) Int. Cl.
*G02F 1/1335* (2006.01)
*G02F 1/13* (2006.01)

(52) U.S. Cl. ............. 349/15; 349/194; 349/99; 349/101

(58) Field of Classification Search .................. 349/15, 349/194, 99, 101
See application file for complete search history.

(56) References Cited

U.S. PATENT DOCUMENTS

| | | | | |
|---|---|---|---|---|
| 4,879,144 | A * | 11/1989 | Nakura et al. | 428/1.25 |
| 6,710,836 | B2 * | 3/2004 | Lee | 349/141 |
| 7,359,013 | B2 * | 4/2008 | Sung et al. | 349/69 |
| 7,446,733 | B1 * | 11/2008 | Hirimai | 345/32 |
| 2008/0040179 | A1 | 2/2008 | Masermann et al. | 705/8 |
| 2009/0073826 | A1 * | 3/2009 | Hendriks et al. | 369/44.32 |

FOREIGN PATENT DOCUMENTS
EP    2 073 397 A1    6/2009
WO    WO-2009/093891 A1    7/2009

OTHER PUBLICATIONS

"Resource Allocation Considerations for Multi-Carrier LTE-Advanced Systems Operating in Backward Compatible Mode", Y. Wang, K. I. Pedersen, P.E. Mogensen, and T. B. Sorensen, in Proc. IEEE PIMRC, Sep. 2009, 5 pgs.
"Architecture Providing Multi-System Carrier Aggregation", U.S. Appl. No. 12/630,257, filed Dec. 3, 2009, 48 pgs.

(Continued)

*Primary Examiner* — Mike Qi
(74) *Attorney, Agent, or Firm* — Anova Law Group, PLLC; Wenye Tan

(57) ABSTRACT

A three-dimensional (3D) display apparatus is provided. The 3D display apparatus includes a display device, a twisted nematic (TN) liquid crystal panel, and a lens unit. The display device is configured to output first polarized lights of an image. The TN liquid crystal panel is coupled to the display device and containing a plurality of controllable pixel display areas to receive the polarized lights with a first polarization direction from the display device. Each pixel display area is capable of being in a first state in which the first polarization direction is transformed into a second polarization direction different from the first polarization direction and a second state in which the first polarization direction is maintained. Further, the lens unit is coupled to the TN liquid crystal panel and is configured to guide the polarized lights with the second polarization direction to pass through and to guide polarized lights with the first polarization direction into predetermined transmitting directions for 3D display.

18 Claims, 4 Drawing Sheets

OTHER PUBLICATIONS

"Feedback for Inter-Radio Access Technology Carrier Aggregation", U.S. Appl. No. 12/774,132, filed May 5, 2010, 50 pgs.

"Draft Report of 3GPP TSG RAN WG1 #62 v0.1.0", 3GPP TSG RAN WG1 Meeting #62bis, MCC Support, Oct. 15, 2010, pp. 22-24.

"On ACK/NACK codebook performance for carrier aggregation", Ericsson, ST-Ericsson, 3GPP TSG-RAN WG1 #62, R1-104840, Aug. 2010, 10 pgs.

"$3^{rd}$ Generation Partnership Project; Technical Specification Group Radio Access Network; Physical channels and mapping of transport channels onto physical channels (FDD) (Release 9)", 3GPP TS 25.211 V9.1.0, Dec. 2009, 58 pgs.

"$3^{rd}$ Generation Partnership Project; Technical Specification Group Radio Access Network; High Speed Downlink Packet Access (HSDPA); Overall description; Stage 2 (Release 8)", 3GPP TS 25.308 V8.0.0, Dec. 2007, 50 pgs.

"$3^{rd}$ Generation Partnership Project; Technical Specification Group Radio Access Network; High Speed Downlink Packet Access (HSDPA); Overall description; Stage 2 (Release 9)", 3GPP TS 25.308 V9.0.0, Jun. 2009, 64 pgs.

"$3^{rd}$ Generation Partnership Project; Technical Specification Group Radio Access Network; Enhanced uplink; Overall description; Stage 2 (Release 9)", 3GPP TS 25.319 V9.0.0, Jun. 2009, 70 pgs.

"$3^{rd}$ General Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", 3GPP TS 36.300 V8.10.0, Sep. 2009, 147 pgs.

"$3^{rd}$ General Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9)", 3GPP TS 36.300 V9.1.0, Sep. 2009, 165 pgs.

"$3^{rd}$ Generation Partnership Project; Technical Specification Group Radio Access Network; Further Advancements for E-UTRA Physical Layer Aspects (Release 9)", 3GPP TR 36.814 V1.2.1, Jun. 2009, 45 pgs.

"$3^{rd}$ Generation Partnership Project; Technical Specification Group Radio Access Network; Requirements for further advancements for Evolved Universal Radio Access (E-UTRA) (LTE-Advanced) (Release 8)", 3GPP TR 36.913 V8.0.1, Mar. 2009, 15 pgs.

\* cited by examiner

TWISTED NEMATIC (TN) BASED 3D DISPLAY SYSTEM AND METHOD

CROSS-REFERENCES TO RELATED APPLICATIONS

This application claims the priority of PCT patent application No. PCT/CN2010/070290 filed on Jan. 20, 2010, the entire contents of which are incorporated herein by reference.

FIELD OF THE INVENTION

The present invention generally relates to twisted nematic (TN) display technologies and, more particularly, to the methods and systems for three dimensional (3D) display based on TN liquid crystal panels.

BACKGROUND

Nowadays, twisted nematic (TN) LC Panel (or TN LC cell) is being widely used in various fields, especially in display technologies. FIG. 1 illustrates a conventional TN LC panel. Glass substrate 11 and glass substrate 12 are arranged in parallel with a predetermined distance therebetween. On the inner surfaces of substrate 11 and substrate 12, transparent electrodes 13 and 14 are provided respectively. Further, on the outer surfaces of the electrodes 13 and 14, alignment layers 15 and 16 are provided respectively, and the rubbing directions of alignment layers 15 and 16 are perpendicular to each other. TN liquid crystal is filled between alignment layers 15 and 16.

When there is no voltage applied between the transparent electrodes 13 and 14, linearly polarized lights entering the TN LC panel via an alignment layer in a direction parallel to the rubbing direction of the alignment layer, the TN LC panel will change the polarization direction of the lights by 90 degrees coming out of the TN LC panel. However, when a voltage applied between the transparent electrodes 13 and 14 is greater than or equal to a threshold voltage, TN molecules re-align the long axis along the direction of the electric field between transparent electrodes 13 and 14, and the TN LC panel does not change the polarization of the entering lights.

Further, conventional 2D/3D switchable display systems, such as one disclosed in Chinese patent application no. CN101387758A, often position an above-mentioned TN LC panel in front of a regular display screen as the 2D/3D switching device. The 2D/3D display is switched by regulating polarization directions of lights passing the TN LC panel through controlling voltages applied to the TN LC panel. Thus, the 2D/3D display switching is often done for the entire display screen and not for different portions of the display screen.

To solve the above problem, other conventional 2D/3D switchable display systems use a thin film transistor (TFT) TN LCD panel as the switching means. Because, in the TFT TN LCD panel, pixels can be individually addressed, 2D/3D switching can be realized on portions of the display screen. However, TFT TN LCD panels are complex and expensive, and often need to place non-transparent TFT circuit wires and grating wires, etc., on the substrates, which may need to be covered by a black matrix. Thus, an effective display area may be reduced, the aperture ratio may be reduced, and the existence of the black matrix may impact image display quality. However, if removing the black matrix, bright lines may appear along the electrodes, which may also impact image display quality.

The disclosed methods and systems are directed to solve one or more problems set forth above and other problems.

BRIEF SUMMARY OF THE DISCLOSURE

One aspect of the present disclosure includes a three-dimensional (3D) display apparatus. The 3D display apparatus includes a display device, a twisted nematic (TN) liquid crystal panel, and a lens unit. The display device is configured to output first polarized lights of an image. The TN liquid crystal panel is coupled to the display device and containing a plurality of controllable pixel display areas to receive the polarized lights with a first polarization direction from the display device. Each pixel display area is capable of being in a first state in which the first polarization direction is transformed into a second polarization direction different from the first polarization direction and a second state in which the first polarization direction is maintained. Further, the lens unit is coupled to the TN liquid crystal panel and is configured to guide the polarized lights with the second polarization direction to pass through and to guide polarized lights with the first polarization direction into predetermined transmitting directions for 3D display.

Another aspect of the present disclosure includes a TN liquid crystal panel. The TN liquid crystal panel includes a first control layer, a second control layer, and a TN liquid crystal layer arranged between the first control layer and the second control layer. The first control layer includes a first substrate, a first electrode section, and a first alignment layer. The second control layer includes a second substrate, a second electrode section, and a second alignment layer. Further, the first electrode section includes a plurality of first electrodes arranged in a first direction and parallel to one another. The second electrode section includes a plurality of second electrodes arranged in a second direction different from the first direction and parallel to one another, and the second direction is perpendicular to the first direction. A plurality of controllable pixel display areas are formed by the plurality of first electrodes, the plurality of second electrodes, and the TN liquid crystal layer to transform a polarization direction of entering lights.

Another aspect of the present disclosure includes a light polarization switching device. The light polarization switching device includes a first control layer having a plurality of first electrodes extending in a first direction, and a second control layer having a plurality of second electrodes extending in a second direction crossing the first direction. The light polarization switching device also includes a twisted nematic (TN) liquid crystal layer sandwiched between the first and second control layers. Further, at least one of the plurality of first electrodes and the plurality of second electrodes has a shape selected from a wave shape, a curve shape, and a zigzag shape.

Other aspects of the present disclosure can be understood by those skilled in the art in light of the description, the claims, and the drawings of the present disclosure.

DETAILED DESCRIPTION

Reference will now be made in detail to exemplary embodiments of the invention, which are illustrated in the accompanying drawings. Wherever possible, the same reference numbers will be used throughout the drawings to refer to the same or like parts.

Figure 6:
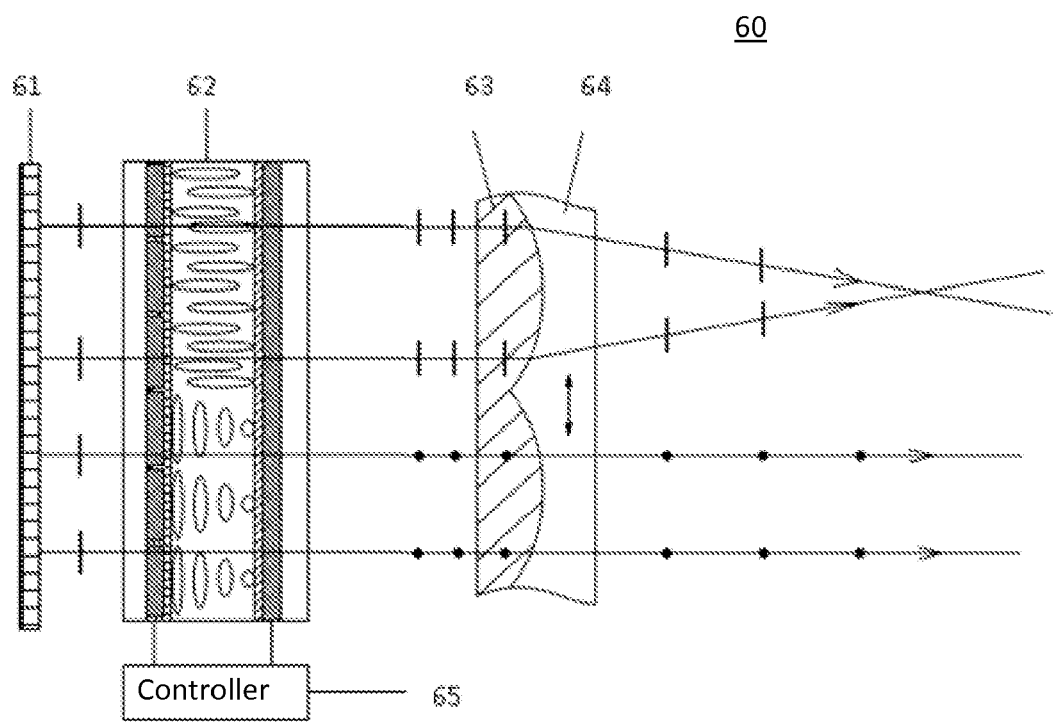
FIG. 6 illustrates an exemplary 3D display system consistent with the disclosed embodiments.

FIG. 6 shows a structural diagram of an exemplary 3D display system 60. As showed in FIG. 6, 3D display system 60 includes a display device 61, a twisted nematic (TN) liquid crystal panel (TN panel) 62, a first lens array 63, a second lens array 64, and a controller 65. Other components may be added and certain devices may be removed without departing from the principles of the disclosed embodiments. Further, space between various components is shown for illustrative purposes, the disclosed embodiments may or may not have such space.

3D display system 60 may be used to display three-dimensional (3D) images. Display device 61 may be provided with sets of images to be viewed by a viewer's left eye and right eye separately. Each set of images are from a different viewpoint. For example, a stereo (two viewpoints) 3D image may include an image set for a viewer's left eye (i.e., a left image) and a corresponding image set for the viewer's right eye (i.e., a right image), with a certain parallax between the left image and the right image. Various viewpoints may also be used.

3D display system 60 may also display full-resolution two-dimensional (2D) images, and may switch between 2D display and 3D display dynamically. Further, 3D display system 60 may also have 2D display and 3D display on a same display screen at the same time. For example, when multiple display windows are opened on display device 61, certain display window or windows may display 3D images, while certain display windows may display 2D images, and each display window may switch 2D display to 3D display or vice versa dynamically.

Display device 61 may include any appropriate device for displaying images, such as a plasma display panel (PDP) display, a cathode ray tube (CRT) display, a liquid crystal display (LCD), an organic light emitting diode (OLED) display, and other types of displays. Display device 61 may be used in computers, consumer electronics, medical equipment, professional equipment, or other systems requiring information display. Optionally, a polarizer sheet may be positioned over display device 61 to make lights from display device 61 linearly polarized before entering TN panel 62.

Figure 7:
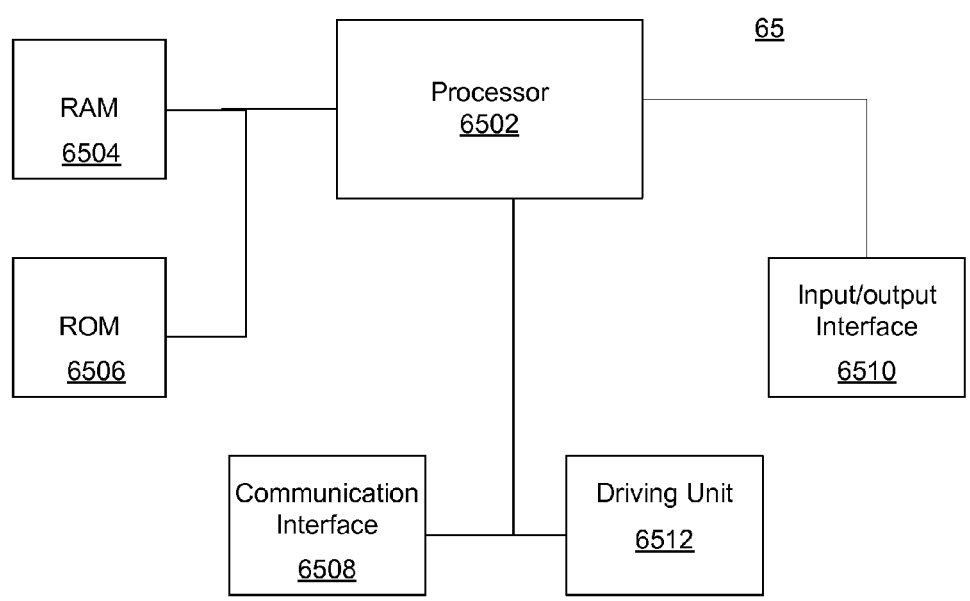
FIG. 7 illustrates a block diagram of an exemplary controller consistent with the disclosed embodiments.

Controller 65 may include any appropriate device for providing control and other functionalities to 3D display system 60. FIG. 7 shows an exemplary block diagram of controller 65. As shown in FIG. 7, controller 65 may include a processor 6502, a random access memory (RAM) unit 6504, a read-only memory (ROM) unit 6506, a communication interface 6508, an input/output interface unit 6510, and a driving unit 6512. Other components may be added and certain devices may be removed without departing from the principles of the disclosed embodiments.

Processor 6502 may include any appropriate type of graphic processing unit (GPU), general-purpose microprocessor, digital signal processor (DSP) or microcontroller, and application specific integrated circuit (ASIC), etc. Processor 6502 may execute sequences of computer program instructions to perform various processes associated with display system 60. The computer program instructions may be loaded into RAM 6504 for execution by processor 6502 from read-only memory 6506.

Communication interface 6508 may provide communication connections such that display system 60 may be accessed remotely and/or communicate with other systems through computer networks or other communication networks via various communication protocols, such as transmission control protocol/internet protocol (TCP/IP), hyper text transfer protocol (HTTP), etc.

Input/output interface 6510 may be provided for users to input information into display system 60 or for the users to receive information from display system 60. For example, input/output interface 6510 may include any appropriate input device, such as a remote control, a keyboard, a mouse, an electronic tablet, voice communication devices, or any other optical or wireless input devices. Further, driving unit 6512 may include any appropriate driving circuitry to drive various devices, such as TN panel 62 and/or display device 61.

Figure 1:
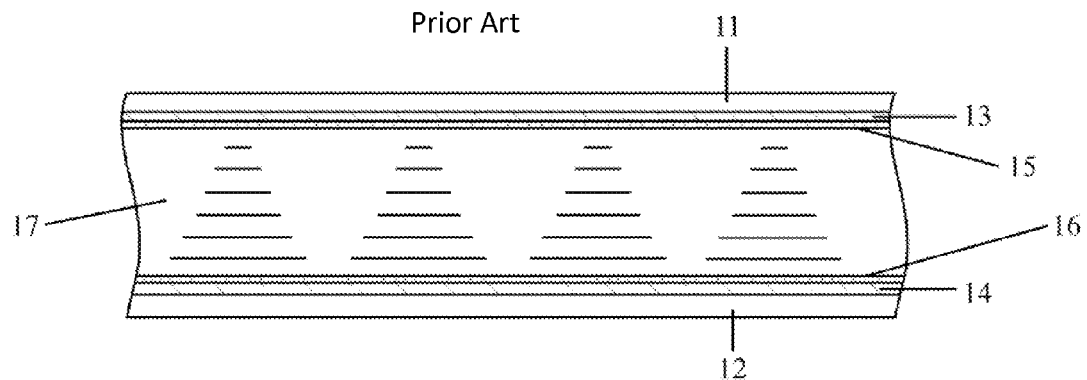
FIG. 1 illustrates a conventional TN cell.
Figure 2:
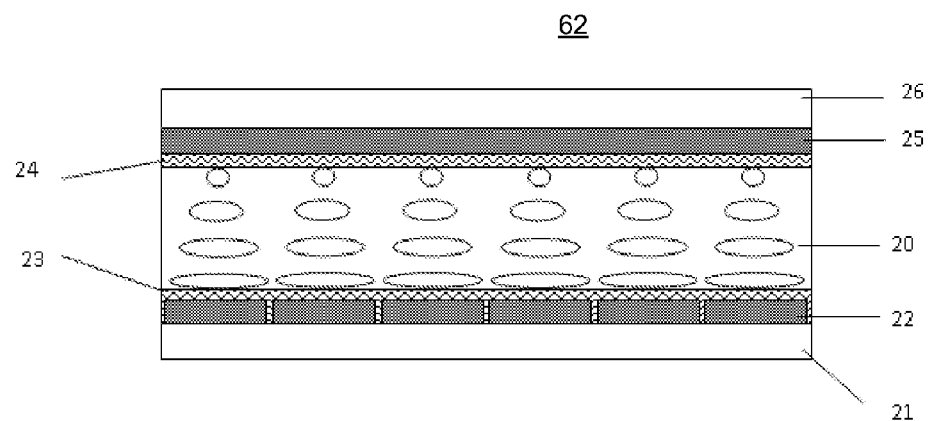
FIG. 2 illustrates a diagram of an exemplary TN panel consistent with the disclosed embodiments.

Returning to FIG. 6, TN panel 62 may include any appropriate device coupled with display device 61 to provide 3D display. FIG. 2 illustrates a diagram of an exemplary TN panel 62. As showed in FIG. 2, TN panel 62 includes a first substrate 21, a first electrode 22, a first alignment layer 23, a second alignment layer 24, a second electrode 25, a second substrate 26, and TN liquid crystal 20. Other components may also be included.

First substrate 21, first electrode 22, and first alignment layer 23 may form a first control layer, while second alignment layer 24, second electrode 25, and second substrate 26 may form a second control layer. TN liquid crystal 20 may be sealed in the space between the first control layer and the second control layer by sealing edges of the first control layer and the second control layer using, for example, special glues. As used here, an electrode may refer to an electrode section including a plurality of electrodes or an individual electrode according to the context of the disclosure.

Figure 3:
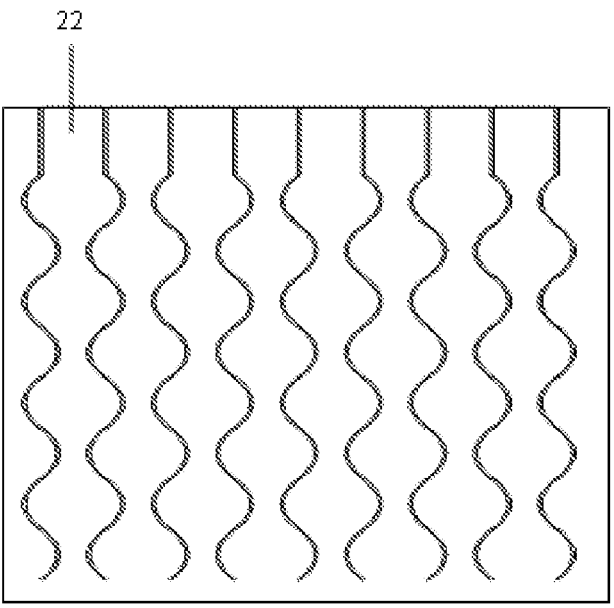
FIG. 3 illustrates an exemplary electrode section consistent with the disclosed embodiments.

In the first control layer, first substrate 21, first electrode 22, and first alignment layer 23 may be made of any appropriate transparent materials. First electrode 22 may include a plurality of electrodes arranged in a certain pattern. The plurality of electrodes may also be in any appropriate shape such that a large area of substrate may be covered by the plurality of electrodes. For example, the plurality of electrodes of first electrode 22 may be in a sinusoid shape, a wave shape, a curve shape, and a zigzag shape, etc. In certain embodiments, the plurality of electrodes of first electrode 22 may be in one or more shape selected from a wave shape, a curve shape, and a zigzag shape. As shown in FIG. 3, a plurality of sinusoid-shaped electrodes of first electrode 22 may be used. Each of sinusoid-shaped strip electrodes may be arranged horizontally in parallel and separated by a certain predetermined distance. Other shapes or arrangements may also be used.

The plurality of first electrodes 22 may be arranged or built on the surface of first substrate 21. First alignment layer 23 is arranged on top of the plurality of first electrodes 22. For example, first alignment layer 23 may be formed by applying an alignment agent on the top of first electrodes 22 and first substrate 21.

Figure 4:
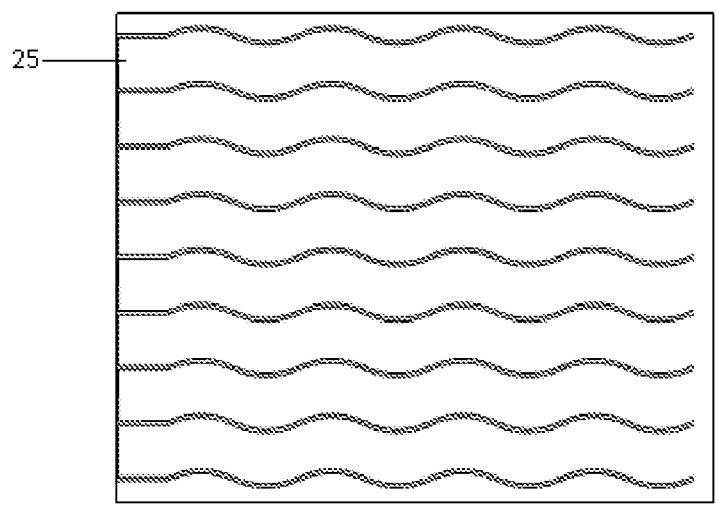
FIG. 4 illustrates an exemplary electrode section consistent with the disclosed embodiments.

Further, in the second control layer, second alignment layer 24, second electrode 25, and second substrate 26 may also be made of any appropriate transparent materials. Similar to the first control layer, as shown in FIG. 4, second electrode 25 may also include a plurality of sinusoid-shaped strip electrodes. The plurality of electrodes of second electrode 25 may also be in a wave shape, a curve shape, and a zigzag shape, etc., or any appropriate shape such that a large area of substrate may be covered by the plurality of electrodes of second electrode 25. For example, the plurality of electrodes of first electrode 22 may be in one or more shape selected from a wave shape, a curve shape, and a zigzag shape. Each of sinusoid-shaped strip electrodes may be arranged vertically in parallel and separated by a certain predetermined distance. That is, the plurality of second electrodes 25 may be arranged in a right angle or any appropriate angle with respect to the plurality of first electrodes 22. Other shapes or arrangements may also be used.

The plurality of second electrodes 25 may be arranged or built on the surface of second substrate 26. Second alignment layer 24 is arranged on top of the plurality of second electrodes 25 with a flat surface. Further, TN liquid crystal layer 20 may be placed between first alignment layer 23 and second alignment layer 24.

Figure 5:
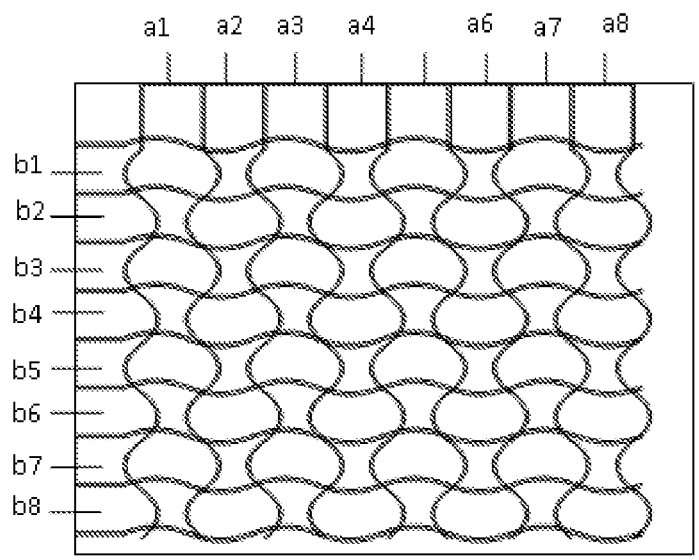
FIG. 5 illustrates an exemplary configuration of a TN panel consistent with the disclosed embodiments.

Thus, the first control layer and the second control layer are arranged in parallel. Further, certain liner materials, e.g. a sealant, may be placed between first alignment layer 23 and second alignment layer 24 to keep the distance between the first control layer and the second control layer, or between first alignment layer 23 and second alignment layer 24, being a predetermined distance. FIG. 5 shows an exemplary configuration of TN panel 62. Although only eight first electrodes a1 to a8 and eight second electrodes b1 to b8 are shown for illustrative purposes, any number of electrodes may be used.

As shown in FIG. 5, the horizontally-arranged plurality of first electrodes 22 and vertically-arranged plurality of second electrodes 25 may overlap each other such that an 8×8 pixel display areas can be formed. That is, the pixel display areas are defined by a1, a2, a3, a4, a5, a6, a7, and a8 in horizontal direction and b1, b2, b3, b4, b5, b6, b7, and b8 in vertical direction. Each display area includes portions of various layers, such as the second control layer, the first control layer, and the TN liquid crystal layer 20 determined by a first electrode and a second electrode. For illustrative purposes, the 8×8 pixel display areas may be represented by an 8×8 two dimensional pixel matrix.

A column of the pixel matrix represents first electrode 22 and a row of the pixel matrix represents second electrode 25. Thus, a pixel display area $a_{ij}$ may represent a pixel display area defined by i-th row and j-th column, wherein i is from 1, 2, 3, ..., 8, and j is also from 1, 2, 3, ..., 8.

When no voltage is applied to electrodes of the pixel display area $a_{ij}$, under the effects of first alignment layer 23 and second alignment layer 24, TN liquid crystal 20 in $a_{ij}$ is twisted by 90 degrees. When lights enter TN panel 62 with a polarization direction parallel to the rubbing direction of the entering alignment layer and pass through TN panel 62, the polarization direction of the lights is rotated in 90 degrees when coming out TN panel 62. This state of TN liquid crystal 20 may be referred as a first state.

On the other hand, when a voltage applied between the electrodes of the pixel display area $a_{ij}$, for example, by applying to the i-th electrode and the j-th electrode separate voltages $U_i$ and $U_j$, respectively, and the difference between $U_i$ and $U_j$ is greater than or equal to a threshold voltage, TN liquid crystal 20 may be in an electric field formed between the i-th electrode and the j-th electrode. TN liquid crystal molecules may re-align the long axis along the direction of the electric field between the i-th electrode and the j-th electrode, i.e., along a direction perpendicular to the direction from first substrate 21 to second substrate 26. Thus, display area $a_{ij}$ does not change the polarization direction of the entering lights. This state of TN liquid crystal 20 may be referred as a second state. Therefore, by applying different voltages to different columns and rows, different pixel display areas can be controlled separately in a different state.

That is, certain pixel display areas may be controlled to be in one of the first state and the second state, while certain other pixel display areas may be controlled to be in the other one of the first state and the second state. In certain embodiments, a row (vertical) scanning mechanism or a column (horizontal) scanning mechanism may be used to control switching between the states of TN liquid crystal 20. Further, the scanning frequency may be chosen such that the TN liquid crystal switches from the first state to the second state in a short time, while remaining in or around the second state for a time period equal to or greater than the period of the scanning frequency. Thus, when scanning the last row of TN panel 62, the first row that is already switched from the first state to the second state can still remain in the second state and does not return to the first state.

For example, in FIG. 5, at the beginning, a same voltage $U_0$ may be applied to electrodes a1 to a8 (i.e., first electrodes 22). To perform the row scanning process, starting with b1, each row from b1 to b8 is scanned and applied to a voltage $U_1$. When scanning a particular row, for example, the $5^{th}$ row (i.e., b5), a pulse voltage $U_2$ may be applied to electrodes a3, a4, a5, a6, and a7, such that the voltage difference between these electrodes and electrode b5, $U_2$-$U_1$, is greater than or equal to $U_{th}$, where $U_{th}$ is the threshold voltage for TN liquid crystal 20 to change state, ($U_1$-$U_0$) is less than $U_{th}$ and ($U_2$-$U_0$) is also less than $U_{th}$. Thus, TN liquid crystal 20 in pixel display areas $a_{53}$, $a_{54}$, $a_{55}$, $a_{56}$, and $a_{57}$ change state from the first state to the second state at about the same time.

Similarly, when scanning the $6^{th}$ row, a pulse voltage $U_2$ may be applied to electrodes a3, a4, a5, a6, and a7, such that the voltage difference between these electrodes and electrode b6, i.e., ($U_2$-$U_1$), is greater than or equal to $U_{th}$, and TN liquid crystal 20 in pixel display areas $a_{63}$, $a_{64}$, $a_{65}$, $a_{66}$, and $a_{67}$ change state from the first state to the second state at about the same time. When scanning the $7^{th}$ row, a pulse voltage $U_2$ may be applied to electrodes a3, a4, a5, a6, and a7, such that the voltage difference between these electrodes and electrode b7, i.e., $U_2$-$U_1$, is greater than or equal to $U_{th}$, and TN liquid crystal 20 in pixel display areas $a_{73}$, $a_{74}$, $a_{75}$, $a_{76}$, and $a_{77}$ change state from the first state to the second state at about the same time.

Further, when scanning the $8^{th}$ row, a pulse voltage $U_2$ may be applied to electrodes a3, a4, a5, a6, and a7, such that the voltage difference between these electrodes and electrode b8, i.e., $U_2$-$U_1$, is greater than or equal to $U_{th}$, and TN liquid crystal 20 in pixel display areas $a_{83}$, $a_{84}$, $a_{85}$, $a_{86}$, and $a_{87}$ change state from the first state to the second state at about the same time. In addition, because of a high scanning frequency, when scanning the $8^{th}$ row, TN liquid crystal 20 in pixel display areas $a_{53}$, $a_{54}$, $a_{55}$, $a_{56}$, $a_{57}$, $a_{63}$, $a_{64}$, $a_{65}$, $a_{66}$, $a_{67}$, $a_{73}$, $a_{74}$, $a_{75}$, $a_{76}$, and $a_{77}$ are still in the second state, while TN liquid crystal 20 in other pixel display areas is in the first state.

Thus, the above example illustrates that pixel display areas of rows 5, 6, 7, and 8 and columns 3, 4, 5, 6, and 7 are controlled in the second state while other pixel display areas are in the first state. That is, with the disclosed methods and systems, individual pixel display areas may be controlled separately. In addition, if there is a need to reverse the state of TN liquid crystal 20 in a pixel display area $a_{ij}$, a pulse voltage may be applied to j-th column during scanning the i-th row such that TN liquid crystal 20 in $a_{ij}$ can reverse its long axis and change back to the first state. A similar column scanning mechanism may also be used.

Returning to FIG. 6, first lens array 63 may include any appropriate single refraction lens arranged in an array configuration, and second lens array 64 may include any appropriate double refraction lens arranged in an array configuration. Further, first lens array 63 may be coupled closely with second lens array 64 to act as certain convex lenses when directing linearly polarized light from display device 61 and TN panel 62.

For illustrative purpose, polarized lights outputted from display device 61 are referred as first polarized lights with a particular polarization direction. If the polarization direction is changed by TN panel 62, the polarized lights outputted from TN panel 62 are referred as second polarized lights with a different polarization direction. Otherwise, TN panel 62 merely passes the first polarized lights. That is, if TN panel 62 does not change the polarization direction of the first polarized lights, no second polarized lights may exist. Further, first alignment layer 23 (i.e., the one close to display device 61) may have the same alignment direction as the first polarized lights, which may be realized by a sheet polarizer over display device 61.

As shown in FIG. 6, first lens array 63 may have a light incident surface which is plane, and a plurality of elongate semi-cylindrical convex surfaces. First lens array 63 may be made of optically isotropic materials with a single refractive index of $n_1$.

The second lens array 64 may have a light output surface which is plane and a plurality of elongate semi-cylindrical concave light incident surfaces. Each concave lens may be coupled to corresponding convex lens from first lens array 63, which may make the two lens arrays a tight-fit, coupled, and double flat surface unit. Other configurations may also be used. Further, second lens array 64 may be made of optically anisotropic materials.

Optically anisotropic material may be birefringent or double refraction, meaning the optically anisotropic material has two different refractive indices, an ordinary refractive index $n_o$ and an extraordinary refractive index $n_e$. Lights with a polarization direction perpendicular to the lens' optical axis have the refractive index of $n_0$; while lights with a polarization direction parallel to the lens' optical axis have a refractive index of $n_e$. The optical axis of second lens array 64 is shown in FIG. 6 as a double arrow, parallel to the polarization direction of the first polarized lights from display device 61. Further, $n_1 = n_o$, and $n_o > n_e$. That is, when first lens array 63 is a convex lens array, the refractive index of the first lens array is equal to a larger one of an ordinary refractive index and an extraordinary refractive index of second lens array 64.

During operation, 3D display system 60 may have both 3D and 2D display on different portions of display screen. For example, as shown in FIG. 6, the upper two rays represent lights for 3D display, and the lower two rays represent lights for 2D display.

For 3D display, controller 65 may control TN panel 62 such that pixel display areas corresponding to the lights for 3D display are in the second state. That is, the first polarized lights of pixels outputted from display device 61 pass through TN panel 62 without change in polarization direction. The first polarized lights then pass first lens array 63 and enter second lens array 64. Because the optical axis of second lens array 64 is parallel to the polarization direction of the first polarized lights, second lens array 64 has a refractive index of $n_e$, $n_1 > n_e$. Thus, this difference between the refractive indices, an optical step, makes lights at the interface between the convex surface of first lens array 63 and the concave surface of second lens array 64 converging. The coupled lens array thus acts as a convex lens and directs the first polarized lights (e.g., lights from a right image and a left image) to a viewer's right eye and left eye respectively to realize 3D display.

On the other hand, for 2D display, controller 65 may control TN panel 62 such that pixel display areas corresponding to the lights for 2D display are in the first state. The first polarized lights may enter TN panel 62 and the polarization direction of the first polarized lights may be changed by TN panel 62 in, for example, 90 degrees. Thus, the second polarized lights are outputted from TN panel 62. Because the polarization direction of the second polarized lights is now perpendicular to the optical axis of second lens array 64, second lens array 64 has a refractive index of $n_0$, and $n_1 = n_o$. Thus, no optical step exists at the interface between convex surface of first lens array 63 and the concave surface of second lens array 64. The second polarized lights therefore go straight through the coupled lens array to the viewer's both eyes without separation to realize 2D display.

In addition, first lens array 63 and second lens array 64 can be designed differently from the ones shown in FIG. 6. For example, first lens array 63 can include concave lens of optically isotropic materials and second lens array 64 can include convex lens of optically anisotropic material with $n_1 = \min(n_o, n_e)$. That is, when first lens array 63 is a concave lens array, the refractive index of the first lens array is equal to a smaller one of an ordinary refractive index and an extraordinary refractive index of second lens array 64. Other types of designs or configurations may also be used.

By using the disclosed systems and methods, separate control over pixel or pixels of display devices may be realized in a simple and flexible way, and the 2D/3D image display quality may also be substantially improved. Further, by using sinusoid-shaped or other wave-shaped electrodes, voltages can be applied at a single end of the sinusoid-shaped electrode strip thus may reduce the amount of wires for individual pixels. Thus, no black matrix may be needed in the disclosed systems, and the effective display area and the aperture ratio may be both increased. Further, bright lines may be avoided or reduced by using sinusoid or wave shaped strip electrodes. In addition, the electrodes do not need to be arranged on a same surface. For example, some electrodes may be on one side of a substrate while other electrodes may be on the other side of the substrate, which may further reduce cost and complexity of the disclosed systems.

What is claimed is:

1. A three-dimensional (3D) display apparatus, comprising:
   a display device configured to output polarized lights of an image;
   a twisted nematic (TN) liquid crystal panel coupled to the display device and containing a plurality of controllable pixel display areas to receive the polarized lights with a first polarization direction from the display device, each pixel display area capable of being in a first state in which the first polarization direction is transformed into a second polarization direction different from the first polarization direction and a second state in which the first polarization direction is maintained; and
   a lens unit coupled to the TN liquid crystal panel and configured to guide the polarized lights with the second polarization direction to pass through and to guide polarized lights with the first polarization direction into predetermined transmitting directions for 3D display.

2. The 3D display apparatus according to claim 1, wherein:
   the plurality of controllable pixel display areas are formed by a plurality of first electrodes arranged in a first direction and parallel to one another and a plurality of second electrodes arranged in a second direction different from the first direction and parallel to one another; and the first direction is perpendicular to the second direction.

3. The 3D display apparatus according to claim 2, wherein:
the plurality of first electrodes and the plurality of second electrodes are in one or more shape selected from a wave shape, a curve shape, and a zigzag shape.

4. The 3D display apparatus according to claim 2, wherein:
the plurality of first electrodes and the plurality of second electrodes are sinusoid-shaped strip electrodes.

5. The 3D display apparatus according to claim 2, further comprising:
a controller coupled to the TN liquid crystal panel and configured to:
set a pixel display area determined by a first electrode and a second electrode in the second state by applying a first voltage difference between the first electrode and the second electrode that is greater than or equal to a threshold voltage; and
set the pixel display area in the first state by applying a second voltage difference between the first electrode and the second electrode that is less than the threshold voltage.

6. The 3D display apparatus according to claim 5, wherein the controller is configured to:
scan the plurality of second electrodes;
apply a pulse voltage to a number of first electrodes to set one or more pixel display area in the second state; and
control a frequency for scanning the plurality of second electrodes such that after a last electrode of the plurality of second electrodes is scanned, the one or more pixel display area remains in the second state.

7. The 3D display apparatus according to claim 1, wherein the lens unit further includes:
a first lens array containing a plurality of single refraction lenses; and
a second lens array coupled to the first lens array and containing a plurality of double refraction lenses corresponding to the plurality of single refraction lenses.

8. The 3D display apparatus according to claim 7, wherein:
an optical axis of the second lens array is parallel to the polarization direction of the first polarized lights.

9. The 3D display apparatus according to claim 7, wherein:
when the first lens array is a convex lens array, the refractive index of the first lens array is equal to a larger one of an ordinary refractive index and an extraordinary refractive index of the second lens array.

10. The 3D display apparatus according to claim 7, wherein:
when the first lens array is a concave lens array, the refractive index of the first lens array is equal to a smaller one of an ordinary refractive index and an extraordinary refractive index of the second lens array.

11. A twisted nematic (TN) liquid crystal panel, comprising:
a first control layer including a first substrate, a first electrode section, and a first alignment layer;
a second control layer including a second substrate, a second electrode section, and a second alignment layer; and
a TN liquid crystal layer arranged between the first control layer and the second control layer, wherein:
the first electrode section includes a plurality of first electrodes arranged in a first direction and parallel to one another;
the second electrode section includes a plurality of second electrodes arranged in a second direction different from the first direction and parallel to one another, the second direction being perpendicular to the first direction; and
a plurality of controllable pixel display areas are formed by the plurality of first electrodes, the plurality of second electrodes, and the TN liquid crystal layer to transform a polarization direction of entering lights.

12. The TN liquid crystal panel according to claim 11, wherein:
the plurality of first electrodes and the plurality of second electrodes are in one or more shape selected from a wave shape, a curve shape, and a zigzag shape.

13. The TN liquid crystal panel according to claim 11, wherein:
a pixel display area determined by a first electrode and a second electrode is set in a first state by applying a first voltage difference between the first electrode and the second electrode that is less than a threshold voltage thereby transforming the polarization direction of the entering lights into a first polarization; and
the pixel display area is set in a second state by applying a second voltage difference between the first electrode and the second electrode that is greater than or equal to the threshold voltage thereby transforming the polarization direction of the entering lights into a second polarization.

14. The TN liquid crystal panel according to claim 11, wherein:
the first alignment layer and the second alignment layer are configured to have a predetermined distance by using a sealant.

15. A light polarization switching device, comprising:
a first control layer having a plurality of first electrodes extending in a first direction;
a second control layer having a plurality of second electrodes extending in a second direction crossing the first direction; and
a twisted nematic (TN) liquid crystal layer sandwiched between the first and second control layers;
wherein at least one of the plurality of first electrodes and the plurality of second electrodes has a shape selected from a wave shape, a curve shape, and a zigzag shape.

16. The light polarization switching device according to claim 15, wherein:
the plurality of first electrodes are arranged in parallel along the first direction;
the plurality of second electrodes are arranged in parallel along the second direction which is perpendicular to the first direction; and
a plurality of controllable pixel display areas are formed by the plurality of first electrodes, the plurality of second electrodes, and the TN liquid crystal layer to transform a polarization direction of entering lights.

17. The light polarization switching device according to claim 16, wherein:
a pixel display area determined by a first electrode and a second electrode is set in a first state by applying a first voltage difference between the first electrode and the second electrode that is less than a threshold voltage thereby transforming the polarization direction of the entering lights into a first polarization; and
the pixel display area is set in a second state by applying a second voltage difference between the first electrode and the second electrode that is greater than or equal to the threshold voltage thereby transforming the polarization direction of the entering lights into a second polarization.

18. The light polarization switching device according to claim 15, wherein:
the first control layer further includes a first alignment layer;
the second control layer further includes a second alignment layer; and
the first alignment layer and the second alignment layer are configured to have a predetermined distance by using a sealant.

* * * * *